US008334034B2

(12) United States Patent
Stoltz et al.

(10) Patent No.: US 8,334,034 B2
(45) Date of Patent: Dec. 18, 2012

(54) RAPID RELEASE AND ANTI-DRIP POROUS RESERVOIRS

(75) Inventors: Geoffrey M. Stoltz, Chester, VA (US); Bennett C. Ward, Midlothian, VA (US); Ronald J. Binshtok, Richmond, VA (US); James R. Lisk, Pembroke, FL (US)

(73) Assignee: Filtrona Porous Technologies Corp., Colonial Heights, VA (US)

( * ) Notice: Subject to any disclaimer, the term of this patent is extended or adjusted under 35 U.S.C. 154(b) by 1490 days.

(21) Appl. No.: 11/857,788

(22) Filed: Sep. 19, 2007

(65) Prior Publication Data

US 2008/0073226 A1 Mar. 27, 2008

Related U.S. Application Data

(60) Provisional application No. 60/847,454, filed on Sep. 27, 2006.

(51) Int. Cl.
*B32B 1/08* (2006.01)

(52) U.S. Cl. ........................................ 428/36.5; 261/99

(58) Field of Classification Search ................. 428/36.5; 261/99

See application file for complete search history.

(56) References Cited

U.S. PATENT DOCUMENTS 3,113,336 A 12/1963 Langnickel
4,968,169 A 11/1990 Yokosuka et al.
5,433,545 A 7/1995 Keil
5,607,766 A 3/1997 Berger
5,620,641 A 4/1997 Berger
5,633,082 A 5/1997 Berger
6,103,181 A 8/2000 Berger
6,244,744 B1 6/2001 Barosso et al.
6,250,511 B1 6/2001 Kelly
6,330,883 B1 12/2001 Berger
6,758,040 B1 7/2004 Sessions et al.
6,840,692 B2 1/2005 Ward et al.
7,018,031 B2 3/2006 Ward et al.
7,416,667 B2 * 8/2008 Benachenou et al. ........ 210/285
2005/0189292 A1 9/2005 Ward et al.

FOREIGN PATENT DOCUMENTS

WO WO 98/09016 3/1998

* cited by examiner

*Primary Examiner* — Robert A Hopkins
(74) *Attorney, Agent, or Firm* — Hunton & Williams LLP

(57) ABSTRACT

A fluid reservoir for retaining a particular fluid against an environmental force is disclosed. The fluid reservoir includes a three dimensional porous body that has a plurality of reservoir capillaries formed therein and has a transport volume and effective capillarity in the force direction for the particular fluid when the porous body is oriented in a predetermined orientation. The fluid reservoir also includes at least one lateral indentation in a surface of the porous body. Each of the at least one lateral indentation defines opposing reservoir surfaces each having a lateral surface component orthogonal to the force direction. The at least one lateral indentation is configured so that at least a majority of the reservoir capillaries have a force-aligned length component that is less than the effective capillarity for the particular fluid.

25 Claims, 7 Drawing Sheets

RAPID RELEASE AND ANTI-DRIP POROUS RESERVOIRS

This application claims the benefit of U.S. Provisional Application No. 60/847,454, filed Sep. 27, 2006, which is incorporated herein by reference in its entirety.

BACKGROUND OF THE INVENTION

The invention relates generally to porous reservoirs, and, more particularly, to an improved porous reservoir with an enhanced ability to retain a relatively large volume of a fluid or solid and release the fluid or solid into another environment. Even more specifically, this invention relates to three dimensional, self-sustaining, porous reservoirs.

Porous reservoirs formed from foam, cloth, non-woven fabrics, paper, sponges, bundled and/or bonded or unbonded natural or man-made fibers, porous metal or plastics, porous ceramic, cotton, linen, and similar fiber-based parts, pumice, asbestos, vermiculite, fused sand and fiber glass may absorb and/or hold various liquid or solid materials. In some applications, such "loaded materials" may be held in a porous article until the porous article is placed into a liquid that is miscible with the loaded material, whereupon the loaded material is released into and/or dissolved by the liquid. An exemplary application is one in which a porous reservoir is loaded with a concentrated cleaning fluid. The porous reservoir may be sized for insertion into a container of water or other liquid for release and dissolution of the cleaning fluid into the water.

In such applications, it is desirable to provide a reservoir that can hold a significant volume of loaded material and release that material as quickly as possible when the loaded reservoir is placed into the miscible liquid. Unfortunately, porous reservoirs generally exhibit a tradeoff between the volume of material that can be held in the porous reservoir (referred to herein as the material "transport volume") and the rate at which the loaded fluid or solid material may be removed from the reservoir and dispersed or dissolved into the miscible fluid (the "dissolution rate"). In particular, reservoirs having a high transport volume generally have low dissolution rates. Conversely, reservoirs with large areas of exposed surface so as to produce high dissolution rates generally have comparatively low transport volumes and or exhibit leakage problems.

These problems tend to limit the usefulness of prior art reservoirs in applications where high transport volume and high dissolution rates are desirable.

SUMMARY OF THE INVENTION

The present invention provides reservoirs having a high transport volume and a high dissolution rate. A particular aspect of the invention provides a fluid reservoir for retaining a particular fluid against an environmental force directed in a force direction. The fluid reservoir comprises a three dimensional porous body that has a plurality of reservoir capillaries formed therein and has a transport volume and effective capillarity in the force direction for the particular fluid when the porous body is oriented in a predetermined orientation. The fluid reservoir also comprises at least one lateral indentation in a surface of the porous body. Each of the at least one lateral indentation defines opposing reservoir surfaces each having a lateral surface component orthogonal to the force direction. The at least one lateral indentation is configured so that at least a majority of the reservoir capillaries have a force-aligned length component that is less than the effective capillarity for the particular fluid.

Another aspect of the invention provides a method of enhancing dissolution and transport volume of a three dimensional, porous reservoir. The three dimensional porous reservoir initially has a plurality of reservoir capillaries formed therein and an initial void volume, fluid-holding capacity, external surface area and effective capillarity in a predetermined direction. The effective capillarity is initially less than a length component in the predetermined direction of a first set of capillaries that is at least a majority of the reservoir capillaries. The method comprises forming at least one lateral indentation in a surface of the reservoir having a vertical surface component. The lateral indentation defines opposing reservoir surfaces, each having a lateral surface component orthogonal to the predetermined direction. The lateral indentation produces a net increase in a ratio of external surface area to volume for the reservoir.

It is to be understood that both the foregoing general description and the following detailed description are exemplary and explanatory only, and are not restrictive of the invention as claimed. The accompanying drawings constitute a part of the specification, illustrate certain embodiments of the invention and, together with the detailed description, serve to explain the principles of the invention.

BRIEF DESCRIPTION OF THE DRAWINGS

In order to assist in the understanding of the invention, reference will now be made to the appended drawings, in which like reference characters refer to like elements. The drawings are exemplary only, and should not be construed as limiting the invention.

DETAILED DESCRIPTION OF THE INVENTION

Figure 1:
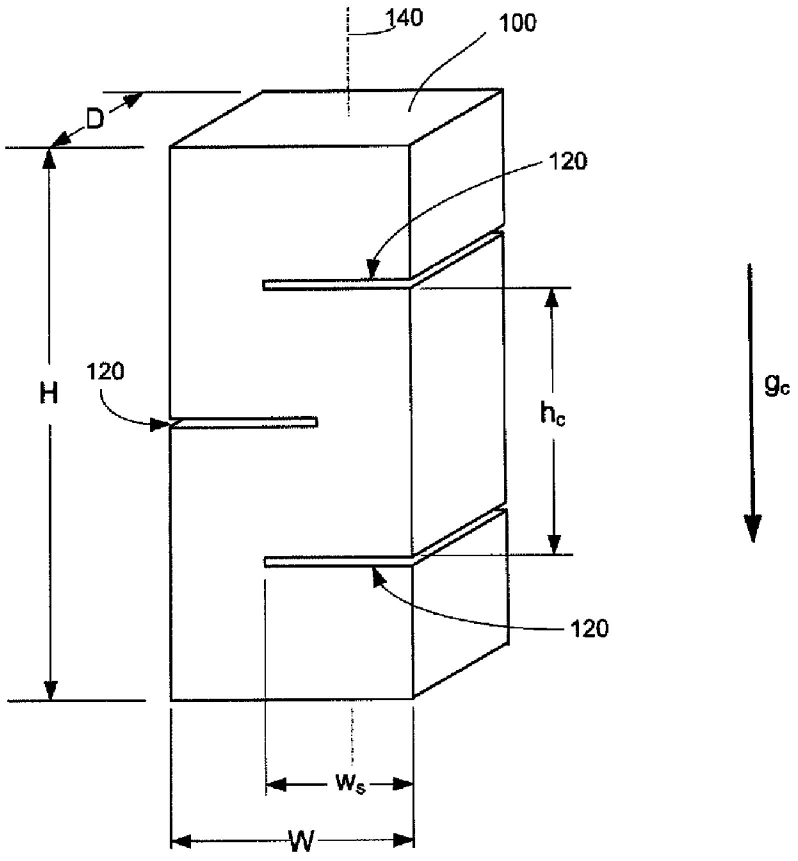
FIG. 1 is a perspective view of a reservoir in accordance with an embodiment of the invention.

The present invention provides porous reservoirs that provide both high transport volume and high dissolution rates. This combination is accomplished through the use of lateral indentations, troughs or slits that serve to both increase the external surface area of the reservoir and reduce the lengths of continuous passages (capillaries) within the porous structure of the reservoir. As is discussed in more detail below, reducing continuous capillary length in the porous structure can, in many instances, be used to increase the transport volume of the reservoir despite a reduction in the void volume.

In general, the transport volume of a porous reservoir for a given loaded material is a function of the reservoir's material, internal structure, and overall geometry and on the environmental forces that must be countered in order to retain the loaded material. In many typical uses, the most significant environmental force is gravity. Other environmental forces may include centrifugal acceleration and jarring or shock during movement of the reservoir.

The porous reservoirs of the invention may be specifically configured to counter such environmental forces. As with porous reservoirs generally, the environmental forces tending to withdraw fluid from the reservoir are countered by the capillary forces (wicking strength) within the reservoir passages. The wicking strength, which stems from interfacial surface tension forces, is dependant on the surface energy of the material defining the reservoir passages and on the geometry of the passages themselves. In particular, the wicking strength is proportional to capillary length.

As used herein, the term "fluid" means a substance whose molecules move freely past one another, including but not limited to a liquid or gas. The term "fluid" as used herein may also be multi-phase, and may include particulate matter suspended in a liquid or gas.

It will be understood by those of ordinary skill in the art that the combination of a particular material formed in a particular internal geometry will establish a particular capillary force potential, referred to herein as "capillarity." It will be further understood that a reservoir's capillarity determines how much capillary force is available to counter environmental forces such as gravity. For example, a reservoir's capillarity will determine how much fluid may be held within a continuous, generally vertically oriented capillary. In instances where the environmental force is substantially fixed (e.g., the force of gravity), capillarity can be expressed as the force-aligned length (i.e., the length component parallel to the force) of a continuous capillary that can retain fluid against the environmental force. Where the environmental force is gravity, the force-aligned length will be the height component of the capillary for a given reservoir orientation.

Based on the above, it can be seen that one of the variables limiting the amount of fluid that can be retained against an environmental force is the reservoir's capillarity. If the reservoir has capillaries that are at least partially aligned with the environmental force and the cumulative length of the aligned portions of each such capillary is greater than the capillarity of the reservoir, then these capillaries will not be filled to their full capacity. This results in a reservoir that has an under-utilized void volume. It will be understood by those of ordinary skill in the art that such a reservoir could still be filled with fluid, but, over time, leakage will occur as the environmental force overcomes the capillarity of the reservoir.

This problem may be countered by configuring the reservoir to reduce the number of capillaries having a length greater than the reservoir capillarity. One way this can be accomplished is to modify the overall dimensions of the reservoir so that the force-aligned length dimension is below a threshold where leakage will occur. For example, the geometry of a reservoir may be configured so that its maximum dimension in a given direction is less than the capillarity. In a particular example, a reservoir intended to maintain a loaded fluid volume against gravity may be configured with a height that is less than the reservoir's capillarity. This approach will typically require that the reservoir's lateral dimensions be increased in order to maintain the desired void volume. While this may result in a large transport volume, it tends to produce reservoir geometries that do not lend themselves to rapid dissolution.

The dissolution rate is the rate at which the contained material in the porous reservoir (i.e., the solute) dissolves when the reservoir is immersed in a solvent. Both diffusion and convection are important to the dissolution rate, with a combination of convection and diffusion normally providing a faster, more desirable dissolution rate than diffusion alone. Dissolution rates may typically be increased by increasing the surface area or surface to volume ratio of the reservoir and/or decreasing the cross sectional area or penetration distance of the reservoir.

It can thus be seen that dissolution rates for a given reservoir material, a given loading material, and a given miscible receiving fluid are primarily a function of the external surface area of the reservoir across which the loaded material and the miscible receiving fluid are exchanged. As used herein, the term "external surface area" refers to the hypothetical outer reservoir surface that would be established if the pores and passages of the reservoir were filled with solid. The term "internal surface area" is used herein to refer to the aggregate internal surfaces of the passages within the reservoir.

A typical approach to maximizing surface area in an article such as a reservoir would be to provide a prismatic body having a high perimeter length cross-section (e.g., a multi-point star). This approach, however, significantly limits the relative volume available for material storage. For a given cross-section, increased volume could be obtained by lengthening the prism, but the effect on transport volume would be limited by the reservoir's capillarity.

The inventors have found that both the dissolution rate and the transport volume of a reservoir body may be increased by forming the reservoir with lateral indentations that may be in the form of cut-outs or slits oriented generally orthogonal to the direction of an environmental force (e.g., gravity or centrifugal force) to be countered by capillary forces. In the following examples and embodiments, the environmental force is assumed to be the force of gravity and force-aligned dimensions are expressed as height dimensions. For example, FIG. 1 illustrates a reservoir 100 formed as a rectangular prism having an overall height H in the vertical direction, a width W and a depth D. The reservoir 100 has a plurality of slits 120 that cut laterally into the prism-shaped reservoir 100. As used herein, the term "slit" refers to an indentation having a height (i.e., dimension parallel to the environmental force) that ranges from 1 mm to 10 mm. In preferred embodiments, the slit height is at least 5 mm. It can be seen that without the slits 120, the external surface area of the reservoir 100 would be 4HW+2HD. The slits 120, however, each provide an increase in external surface area of approximately $2w_sD$. Depending on the geometry of the reservoir, the lateral indentations of the invention can produce nearly unlimited increases in surface area. In typical embodiments, increases in surface area from 1% to 200% are achieved.

It can readily be seen that the slits 120 significantly increase external surface area without greatly reducing the reservoir volume. However, if the dimensions and geometry of the reservoir 100 are such that the height dimensions of the capillaries within the reservoir 100 are greater than the capillarity of the reservoir 100, then the lateral slits 120 will produce an even greater increase in the transport volume of the reservoir 100. This is because the slits 120 are oriented laterally with respect to the force of gravity $g_c$ when the reservoir 100 is oriented with it longitudinal axis 140 aligned with the gravity vector. As a result, any capillaries that intersect the slits 120 will be cut, thereby producing two shorter capillaries. This effectively reduces the vertical component of the capillary length. If the original length of the capillary was greater than the capillarity and the lengths of one or both of the resulting "split" capillaries is less than the capillarity, then the amount of fluid that can be held by the split capillaries may be greater than the amount that could be held by the original un-split capillary. This effect translates to an increase in the overall transport volume of the reservoir.

Figure 2:
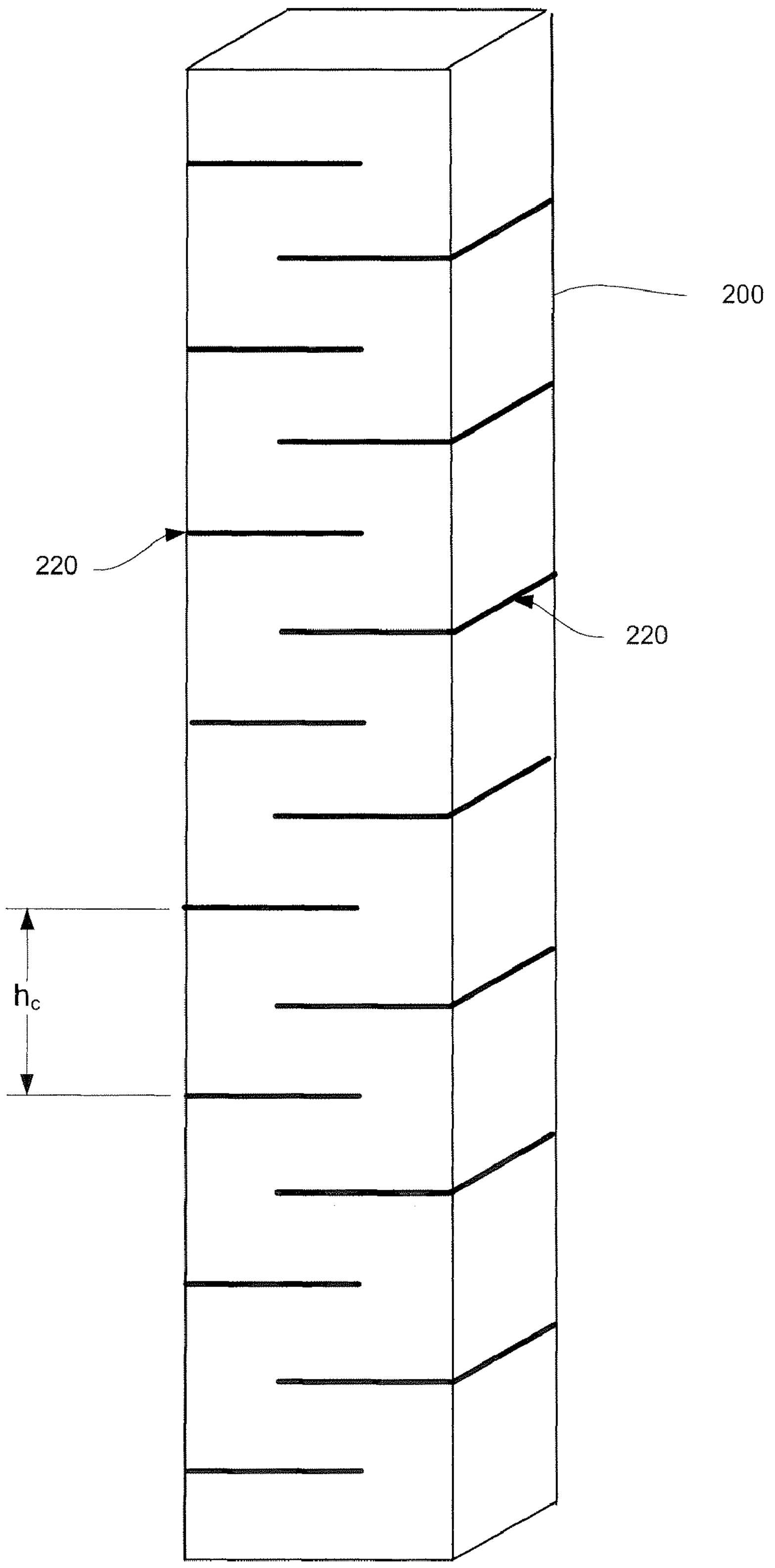
FIG. 2 is a perspective view of a reservoir in accordance with an embodiment of the invention.

It can be seen that the increase in transport volume of the fluid will be highly dependent on the placement and geometry of the slits 120. For example, the slits 120 may alternately extend from opposing sides of the reservoir 100 as shown in FIG. 1 and may extend past the centerline of the reservoir 100 so that they "overlap." The nearer to the opposite side the slits 120 extend, the greater the number of capillaries shortened. It can also be seen that the greater the number of slits 120, the more effective the slits 120 will be in reducing capillary length throughout the reservoir 100. FIG. 2, for example, illustrates a reservoir 200 with a large number of slits 220. It can also be seen that if the slit width $w_s$ is greater than half the reservoir width W, then the maximum vertical length of at least the majority of the shortened capillaries will be the distance between same-side slits, represented by $h_c$. Accordingly, in many embodiments, transport volume can be maximized by assuring that the distance between adjacent slits on the same side of a reservoir body is less than the capillarity of the reservoir.

The slits 220 can be formed in any number or combination of vertically or partially vertically oriented sides of the reservoir 200. They can, for example, be formed or cut in adjacent or other non-opposing sides of the reservoir structure.

It will be understood that the reservoir surfaces defined by slits 220 need not be exactly orthogonal to the gravitational or other force; they need only have an orthogonal component that will serve to interrupt the vertical length component of the reservoir capillaries. Accordingly, the slits 220 need not be straight horizontal lines.

Figure 3:
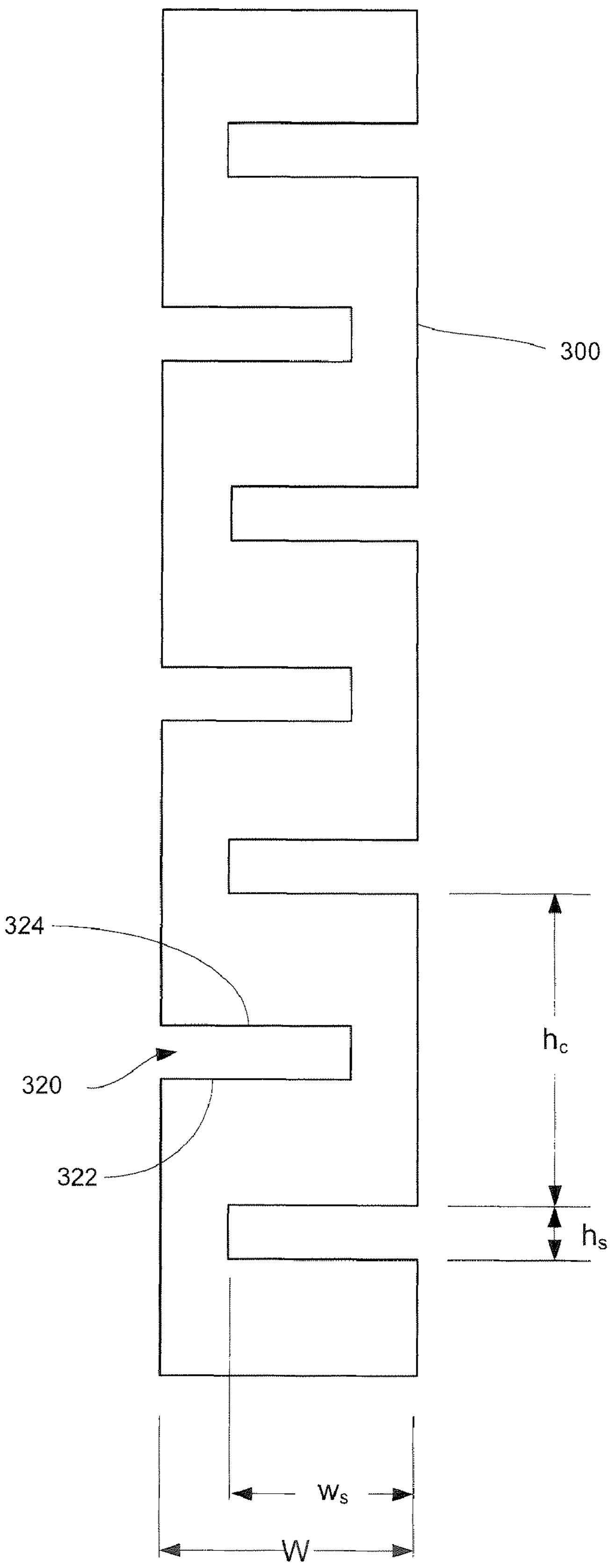
FIG. 3 is a front elevation view of a prismatic reservoir in accordance with an embodiment of the invention.

Taking this aspect even further, the lateral indentations in the reservoir need not even be thin slits. Instead, they may be formed as slots having an appreciable vertical width. FIG. 3 illustrates a prismatic reservoir 300 having a plurality of slots 320 having similar lateral dimensions to the slits of the previous embodiments. The slots 320, however, also have a significant height dimension $h_s$ that represents the width of the slot. This has the effect of reducing the void volume in the reservoir 300. However, it has been found that, spacing the lateral surfaces 322, 324 of the slots 320 more than a minimal distance can assist in enhancing dissolution of material loaded in the reservoir 300, particularly when assisted by lateral agitation or convection. As in the previous embodiments, if the indentation (in this case, a slot) width $w_s$ is greater than half the reservoir width W, then the maximum vertical length of at least the majority of the capillaries intersecting the indentations 320 will be the distance between same-side indentations 320, represented by $h_c$. Accordingly, transport volume can be maximized by assuring that the distance between adjacent indentations/slots on the same side of a reservoir body is less than the capillarity of the reservoir.

Figure 4:
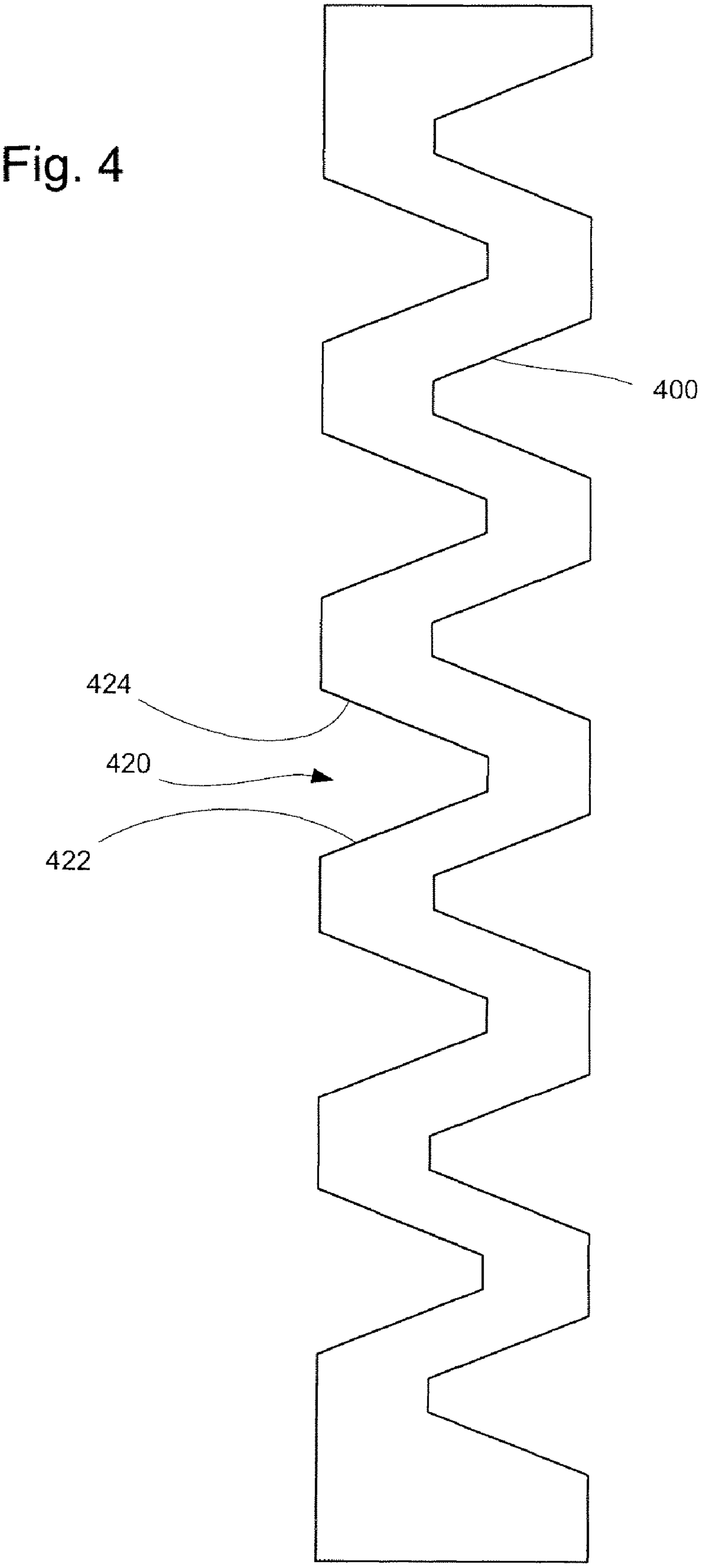
FIG. 4 is a front elevation view of a prismatic reservoir in accordance with an embodiment of the invention.

In various embodiments of the invention, porous reservoirs of the invention may have laterally oriented indentations that are cylindrical, spherical, rectangular, triangular, flute shaped or any other regular or irregular, symmetric or asymetric shape. In a particular embodiment illustrated in FIG. 4, a prismatic reservoir 400 has a plurality of slots 420 formed as trapezoids. As in the preceding embodiment, the slots 420 have lateral surfaces 422, 424 that increase external surface area and interrupt capillaries within the reservoir 400.

Figure 5:
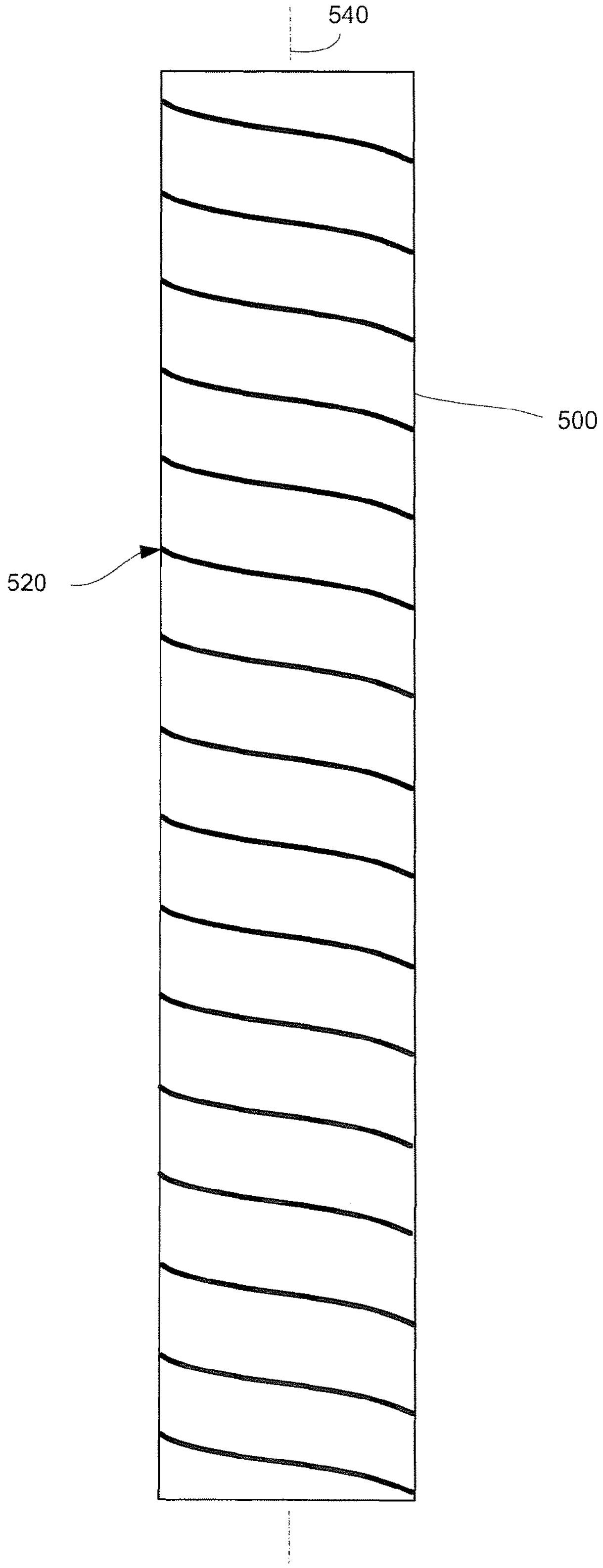
FIG. 5 is an elevation view of a cylindrical reservoir in accordance with an embodiment of the invention.
Figure 6A:
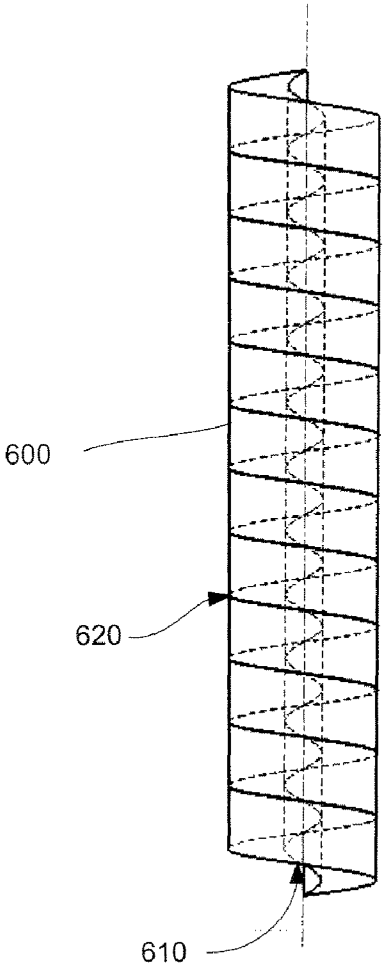
FIGS. 6A and 6B are elevation views of two configurations of a cylindrical reservoir in accordance with an embodiment of the invention.
Figure 6B:
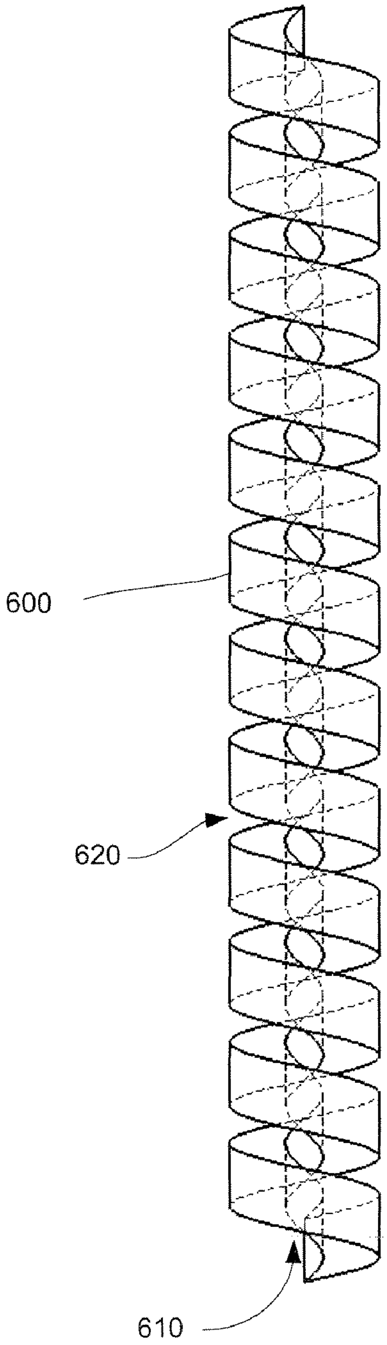

In another embodiment illustrated in FIG. 5, a cylindrical reservoir 500 has a single slit 520 that forms a spiral around the centerline 540 of the cylinder. Another variation on the spiral approach in shown in FIGS. 6A and 6B. In this embodiment, a cylindrical reservoir 600 having a cylindrical center perforation 610 and a spiral slot 620 that extends from the outer surface of the cylinder all the way through to the center perforation 610. Depending on the material used to form the reservoir 600, this may be stretched to form the helical structure shown in FIG. 6B.

Porous reservoirs in accordance with embodiments of the present invention may have a variety of overall geometries and sizes. A reservoir of the invention may be a cylinder, a prism, rectangle or any other shape. In some embodiments, the porous reservoir may be sized and shaped to fit into a bottle or other fluid container. Any of these reservoirs, including prismatic reservoirs, may have one or more longitudinal perforations, which may be used to increase dissolution surface area or to allow for the mounting of the reservoir on a support structure such as a rod that extends from one or both ends of the reservoir for ease in handling the reservoir.

In various embodiments, reservoirs formed from relatively flexible or elastic materials may be elongated or otherwise deformed to change their geometry prior to use. The size and configuration of the lateral indentations may be used to facilitate such changes. For example, the use of lateral indentation that extend across a majority of the lateral width of the reservoir may allow (or enhance) the ability of the reservoir to stretch in an accordion fashion.

The lateral indentations in reservoirs of the invention may be integrally formed in the initial process of forming the reservoir structure. Alternatively, the lateral indentations may be established in a pre-formed porous reservoir, such as by shearing, drilling, cutting or milling material.

In some embodiments, the reservoir may be deformed either permanently, such as by stretching the reservoir beyond its yield point, or temporarily, for instance by putting the reservoir onto a curved rod or tube. The deformation may increase the external surface area of the lateral indentations of the reservoir thereby improving the dissolution rate of the reservoir.

The reservoirs of the invention may be formed from any material that can be used to form a porous structure that uses capillary action to retain a material within the reservoir. Porous reservoirs may be formed of foam, cloth, non-woven fabrics, paper, and sponges. The reservoirs may also be made of one of many materials including, but not limited to, bundled and/or bonded or unbonded natural or man-made fibers, porous metal or plastic, and porous ceramic. Further, reservoirs may be made of natural materials, such as natural sponges, cotton, linen and similar fiber-based parts. Also, some mineral based materials, such as pumice, asbestos, vermiculite, fused sand and fiber glass, may function as reservoir materials.

A structure type that is of particular utility in the reservoirs of the invention is the bonded fiber structure type. As described in U.S. Pat. Nos. 5,620,641; 5,633,082; 6,103,181; 6,330,883; and 6,840,692, each of which is incorporated herein by reference in its entirety, bonded fiber structures may be formed as three dimensional, self-sustaining structures that are particularly useful as wicks or reservoirs. In many instances, these structures are formed using bicomponent polymer fibers. As used herein, the term "bicomponent fiber" as used herein refers to the use of two polymers of different chemical nature placed in discrete portions of a fiber structure. While other forms of bicomponent fibers are possible, the more common techniques produce either "side-by-side" or "sheath-core" relationships between the two polymers. For example, bicomponent fibers comprising a core of one polymer and a coating or sheath of a different polymer are particularly desirable for many applications since the core material may be relatively inexpensive, providing the fiber with bulk and strength, while a relatively thin coating of a more expensive or less robust sheath material may provide the fiber with unique properties.

Bicomponent fibers used to form reservoirs of the invention may be formed using any suitable method. The reservoirs formed from such fibers may be constructed by passing a bundle of fibers through a heated die to form a three dimensional, porous, self sustaining reservoir element. In accordance with some embodiments of the present invention, the bicomponent fiber may be a sheath-core bicomponent fiber, where the sheath polymer may serve as both a low melting material to facilitate bonding, and may have special properties (such as a specific surface energy) to create beneficial capillary properties.

A reservoir in accordance with some embodiments of the present invention may alternatively be formed of monocomponent fibers, such as nylon or cellulose acetate, which may be bonded to form three dimensional, porous, self sustaining reservoir elements via the use of plasticizers to facilitate bonding with steam or other heat sources. Additionally, reservoirs may be three dimensional reservoirs formed of reticulated (open cell) polyurethane, or other elastomeric, foam.

Other reservoirs in accordance with some' embodiments of the present invention may be sintered, porous plastics or ceramics.

As noted above, reservoirs in accordance with some embodiments of the present invention may include a channel (a hole) through the core or inner area of the reservoir that extends from the upper portion of the reservoir to a lower portion of the reservoir. The channel may be of sufficient shape and/or size to accommodate a rod, tube, dip tube or any other insertion device. In a specific embodiment, the dip tube of a spray bottle may be inserted through the channel of the reservoir. Further in the embodiment, the reservoir will retain a fluid or solid until the dip tube is inserted in the spray bottle and the reservoir contacts the contents of the spray bottle. Additionally, in the embodiment, upon contact with the contents of the spray bottle, the fluid or solid within the reservoir will rapidly dissolve in the contents of the spray bottle. Further, in the embodiment, agitation of the spray bottle or the reservoir will improve the dissolution rate of the reservoir.

It will be understood that the reservoirs of the invention may be configured so as to counter environmental forces in more than a single direction. For example, different indentation sets may be configured to be "lateral" with respect to different anticipated force directions. It will also be understood that in embodiments where lateral indentations are configured to reduce capillary length in one particular direction, the geometry of the reservoir may be configured with an increased overall length in that direction. The dimensions of the reservoir in other directions may be specifically configured to be less than the reservoir capillarity. For example, a cylindrical reservoir intended to provide enhanced vertical leakage performance may be configured with a relatively large axial dimension and a small diameter. The axial dimension could be of any length so long as sufficient lateral indentations are provided to reduce the vertical capillary lengths when the reservoir is stood on end. On the other hand, if the diameter is shorter than the capillarity, the reservoir will not leak when the cylinder is placed on its side.

Aspects of certain embodiments of the invention are demonstrated in the following examples.

EXAMPLE 1

A cylindrical bonded bicomponent polyolefin fiber reservoir structure with nominally 85% void volume, about 70 mm long and about 24 mm in diameter with a 4 mm diameter hole through its longitudinal center was made. The reservoir shape was formed in a die under length-oriented tension using steam as the heating medium, and then cut to length. The reservoir was elastic enough to recover completely from a 5% extension. The external diameter of the reservoir was sized to fit into the neck of a typical spray bottle. The diameter of the channel or hole of the reservoir was sized to accommodate the 4 mm o.d. dip tube of a typical household cleaner spray nozzle. The capillary strength of the reservoir was sufficient to hold about 17 grams of a cleaner concentrate solution. The reservoir included partial thickness slits (i.e., lateral indentations having essentially zero height) along the length of the reservoir alternating on each side with 5 mm spacing between slits. The slit depth extended to a point immediately through the channel or hole. The slits provided an additional exterior surface area (increasing the quantity of area for dissolution) and were perpendicular to the long axis (dip tube axis) of the reservoir.

The reservoir was inserted onto the dip tube using the channel or hole in the core/interior of the reservoir, and the dip tube was inserted into the spray bottle containing water. As the dip tube was inserted a spray nozzle was attached. When inserted in the spray bottle, the dip tube flexed to fit into a corner of the bottle bottom. The reservoir lengthened and the lengthening of the reservoir widened the slits of the reservoir, which served to enhance dissolution of the 'concentrate' into the water.

The bottle was agitated by inverting and then righting six times, then allowed to stand. The cleaner concentrate was dyed, with the dye having an absorbance maximum at 550 nm. Aliquots were take from the bottle at 1, 5, 10, 20, 30 and 35 minute increments, and the absorbance measured in a UV/Vis spectrophotometer to quantitatively measure the amount of concentrate released into the bulk water in the bottle.

Figure 7:
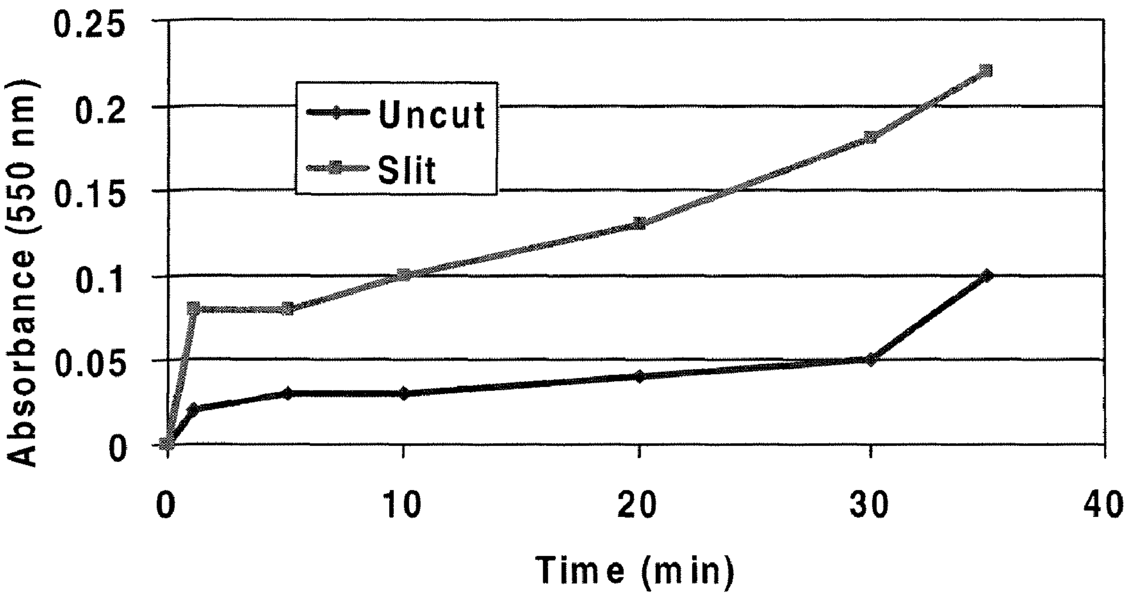
FIG. 7 graphically depicts loaded fluid release data for certain reservoirs of the invention.

FIG. 7 graphically depicts the results versus time as compared to a similar reservoir with no slits. Throughout the test period the slit reservoir exhibited a dissolution rate more than twice that of the un-slit reservoir.

EXAMPLE 2

The reservoir of Example 1 was stretched beyond a yield point of the reservoir material, thereby extending the original length and causing the slits to open. The reservoir was stretched to twice its original length dimension, thereby producing wider slit openings. The elongated reservoir was mounted on a dip tube and placed in a spray bottle, following a process similar to that outlined in Example 1. The reservoir experienced improved concentrate release characteristics when compared to a comparable reservoir without slits. Throughout the test period, the slit/extended reservoir exhibited a dissolution rate more than twice that of an un-slit reservoir. The results for dissolution versus time were similar to the reservoir of Example 1.

It will be apparent to those skilled in the art that the present invention is susceptible of a broad utility and application. Various modifications and variations can be made in the method, manufacture, configuration, and/or use of the embodiments of the invention without departing from the scope or spirit of the invention. It is to be understood, therefore, that this disclosure is not intended or to be construed to limit the present invention or otherwise to exclude any other embodiments, adaptations, variations, modifications and equivalent arrangements, the invention being limited only by the claims presented herewith.

What is claimed is:

1. A fluid reservoir for retaining a particular fluid against an environmental force directed in a force direction, the reservoir comprising:

a three dimensional porous body having a plurality of reservoir capillaries formed therein and having a transport volume and effective capillarity in the force direction for the particular fluid when the porous body is oriented in a predetermined orientation; and at least one lateral indentation in a surface of the porous body, each of the at least one lateral indentation defining opposing reservoir surfaces each having a lateral surface component orthogonal to the force direction, wherein the at least one lateral indentation is configured so that at least a majority of the reservoir capillaries have a force-aligned length component that is less than the effective capillarity for the particular fluid.

2. A fluid reservoir according to claim 1 wherein the at least one lateral indentation provides an increase in porous body surface area in a range of 1% to 200% over a surface area of a non-indented porous body having an otherwise identical geometry to that of the three dimensional porous body.

3. A fluid reservoir according to claim 1 wherein each of the at least one lateral indentation provides a maximum force-aligned spacing between the opposing reservoir surfaces that is no less than 5 mm.

4. A fluid reservoir according to claim 1 wherein the three dimensional porous body is a right circular cylinder having a reservoir radius, wherein the axial centerline of the cylinder is parallel to the force direction when the porous body is in the predetermined orientation.

5. A fluid reservoir according to claim 4 wherein each of the at least one lateral indentation has a maximum dimension orthogonal to the axial centerline that is greater than the reservoir radius.

6. A fluid reservoir according to claim 1 wherein the three dimensional porous body is a prism having first and second end faces through which a longitudinal axis passes, the longitudinal axis being parallel to the force direction when the porous body is in the predetermined orientation.

7. A fluid reservoir according to claim 6 wherein the three dimensional porous reservoir has a constant cross-section with a width dimension in a lateral direction orthogonal to the longitudinal axis and wherein the at least one lateral indentation has a maximum dimension parallel to the lateral direction that is greater than half the width dimension.

8. A fluid reservoir according to claim 6 wherein the porous body has opposing first and second side faces extending from the first end face to the second end face and wherein the reservoir comprises a plurality of lateral indentations, some of which extend inwardly through the first side face and some of which extend inwardly through the second side face.

9. A fluid reservoir according to claim 6 wherein the porous body has a side face extending from the first end face to the second end face and a plurality of lateral indentations extending inwardly through the side face, the lateral indentations being spaced apart at regular intervals in the longitudinal direction.

10. A fluid reservoir according to claim 1 wherein the porous body has a through hole extending from the first end surface to the second end surface.

11. A fluid reservoir according to claim 1 wherein the porous body comprises one of the set consisting of a foam material, a cloth material, a non-woven fabric material, a paper material and a sponge.

12. A fluid reservoir according to claim 1 wherein the porous body comprises a material selected from the set consisting of bonded or unbonded natural or man-made fibers, bundled fibers, a porous metal, a porous plastic, a porous ceramic, cotton, linen, pumice, asbestos, vermiculite, fused sand and fiber glass.

13. A fluid reservoir according to claim 1 wherein the porous body is formed as a three dimensional bonded fiber structure formed from a plurality of polymer fibers bonded to one another at spaced apart points of contact.

14. A fluid reservoir according to claim 13 wherein the fibers are bicomponent fibers.

15. A method of enhancing dissolution and transport volume of a three dimensional, porous reservoir having a plurality of reservoir capillaries formed therein and an initial void volume, fluid-holding capacity, external surface area and effective capillarity in a predetermined direction, the effective capillarity being less than a length component in the predetermined direction of a first set of capillaries that is at least a majority of the reservoir capillaries, the method comprising:

forming at least one lateral indentation in a surface of the reservoir having a vertical surface component, the lateral indentation defining opposing reservoir surfaces each having a lateral surface component orthogonal to the predetermined direction, the lateral indentation producing a net increase in a ratio of external surface area to volume for the reservoir.

16. A method according to claim 15 wherein the at least one lateral indentation reduces the predetermined direction length component of at least a majority of the first set of capillaries to less than the effective capillarity.

17. A method according to claim 15 wherein the at least one lateral indentation provides an increase in external surface area in a range of 1% to 200%.

18. A method according to claim 15 wherein each of the at least one lateral indentation has a maximum spacing between the opposing reservoir surfaces in the predetermined direction that is no less than 5 mm.

19. A method according to claim 15 wherein the three dimensional porous reservoir is a right circular cylinder having a reservoir radius and an axial centerline parallel to the predetermined direction.

20. A method according to claim 19 wherein each of the at least one lateral indentation has a maximum dimension orthogonal to the predetermined direction that is greater than the reservoir radius.

21. A method according to claim 15 wherein the three dimensional porous reservoir is a prism having first and second end faces through which a longitudinal axis passes, the longitudinal axis being parallel to the predetermined direction.

22. A method according to claim 21 wherein the three dimensional porous reservoir has a constant cross-section with a width dimension in a lateral direction orthogonal to the longitudinal axis and wherein the at least one lateral indentations has a maximum dimension parallel to the lateral direction that is greater than half the width dimension.

23. A method according to claim 21 wherein the porous body has a side face extending from the first end face to the second end face and a plurality of lateral indentations extending inwardly through the side face, the lateral indentations being spaced apart at regular intervals in the longitudinal direction.

24. A method according to claim 15 wherein the porous reservoir comprises at least one of the set consisting of a foam material, a cloth material, a non-woven fabric material, a sponge material, and a material selected from the set consisting of bonded or unbonded natural or man-made fibers, a porous metal, a porous plastic, and a porous ceramic.

25. A method according to claim 15 wherein the porous reservoir is formed as a three dimensional bonded fiber structure formed from a plurality of polymer fibers bonded to one another at spaced apart point of contact.

* * * * *